March 3, 1970 A. WOITT 3,498,034
HOP PICKING MACHINE
Filed Feb. 2, 1967 5 Sheets-Sheet 3

Alfred Woitt
INVENTOR.

March 3, 1970  A. WOITT  3,498,034
HOP PICKING MACHINE
Filed Feb. 2, 1967  5 Sheets-Sheet 4

Alfred Woitt
INVENTOR.

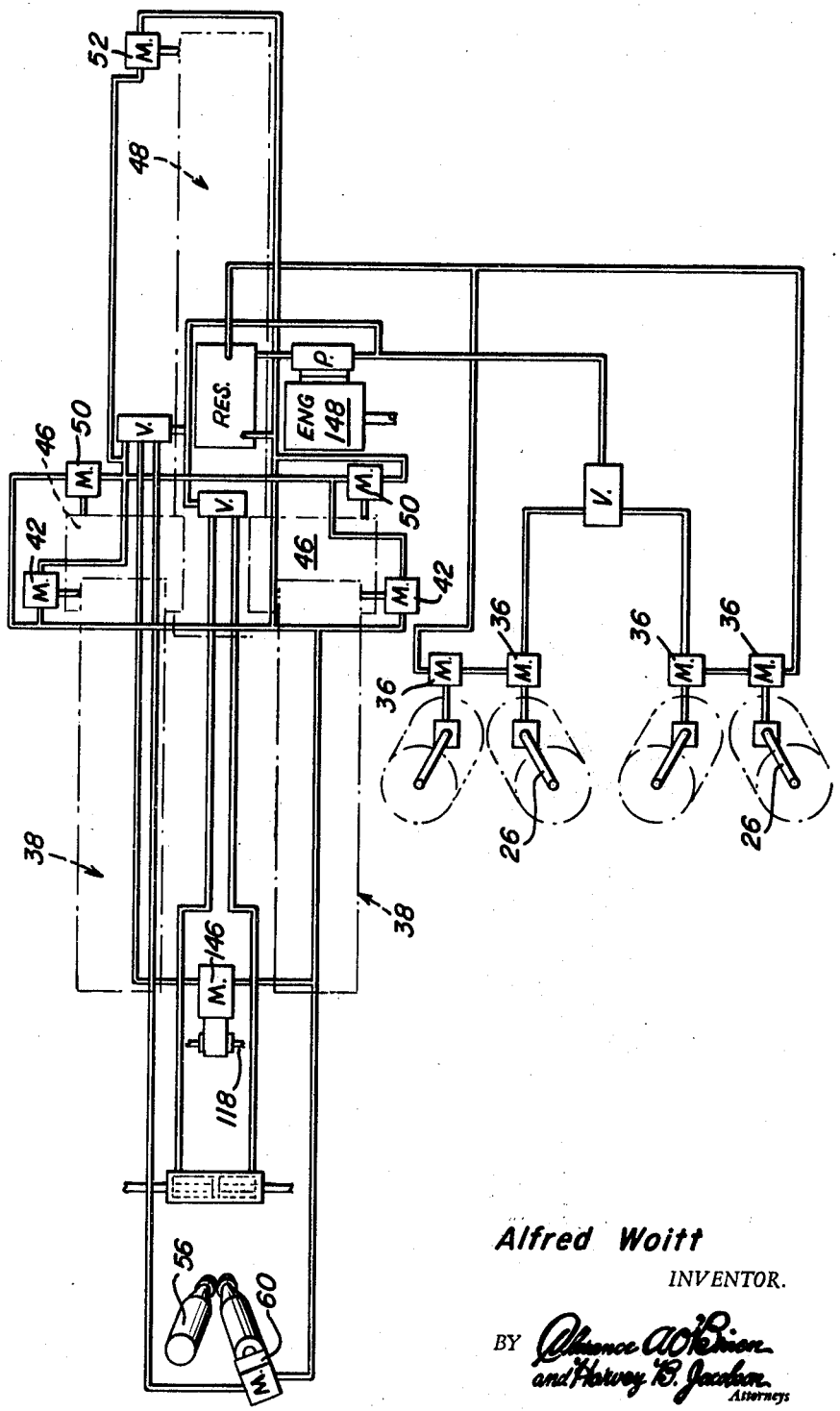

United States Patent Office 3,498,034
Patented Mar. 3, 1970

3,498,034
HOP PICKING MACHINE
Alfred Woitt, 210 S. 46th Ave.,
Yakima, Wash. 98901
Filed Feb. 2, 1967, Ser. No. 613,588
Int. Cl. A01g 19/02
U.S. Cl. 56—19            18 Claims

ABSTRACT OF THE DISCLOSURE

A machine for picking hops directly from the vine in the field. A cutting unit releases each vine from the overhead supporting trellis and positions the vine within a picking unit through which it is continuously forwardly drawn by grasping rollers which ultimately lay the vine on the ground beneath the machine and between the supporting wheels. The hops released by the picking unit are conveyor carried to an ultimate rearwardly directed discharge point.

---

The instant invention generally relates to hop picking machines, and is more particularly concerned with a machine which enables a picking of the hops directly from the vine in the field in a manner which allows a preservation of both the root system and the entire vine, aside from possibly the uppermost tip thereof, so as to enable a completion of the natural growing cycle.

While machines for picking or stripping hops directly from the vine in the field are known, such machines, if not actually severing the vine and destroying the plant root, tend to act in a manner which badly bruises the plant and detrimentally compacts the dirt around the root system through the utilization of an enlarged centrally located roller for drawing the vine through the picking unit. This roller, in such machines, travels directly over the root system, effecting a highly undesirable compacting thereof, and simultaneously travels along the full length of the vine, forcing the vine into the ground and, in light of the transfer of a substantial portion of the weight of the machine to the roller, tending to badly bruise the vine in a manner which would inhibit a natural completion of the growing cycle of the vine.

Accordingly, it is a primary object of the instant invention to provide a machine which, while stripping hops from the vines without a severing of the vines, does so without either the vines or the root systems thereof sustaining damage.

In conjunction with the above object, it is a significant object of the instant invention to provide a hop picking machine wherein an automatic cutting unit is utilized in releasing each vine from the overhead supporting trellis wire, this unit subsequently properly positioning the vine within the picking unit for a drawing of the vine forwardly therethrough in a manner which introduces only such pressure on the vines as required to draw the vines through the picking unit, with each vine, upon being discharged from the picking unit, centrally falling to the ground beneath the advancing machine in a position whereby the vine, as well as the root system thereof, will be straddled by the support wheels of the machine so as to introduce no compacting or bruising weight thereto.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 7 is a schematic view of the hydraulic drive system of the machine.

Figure 2:
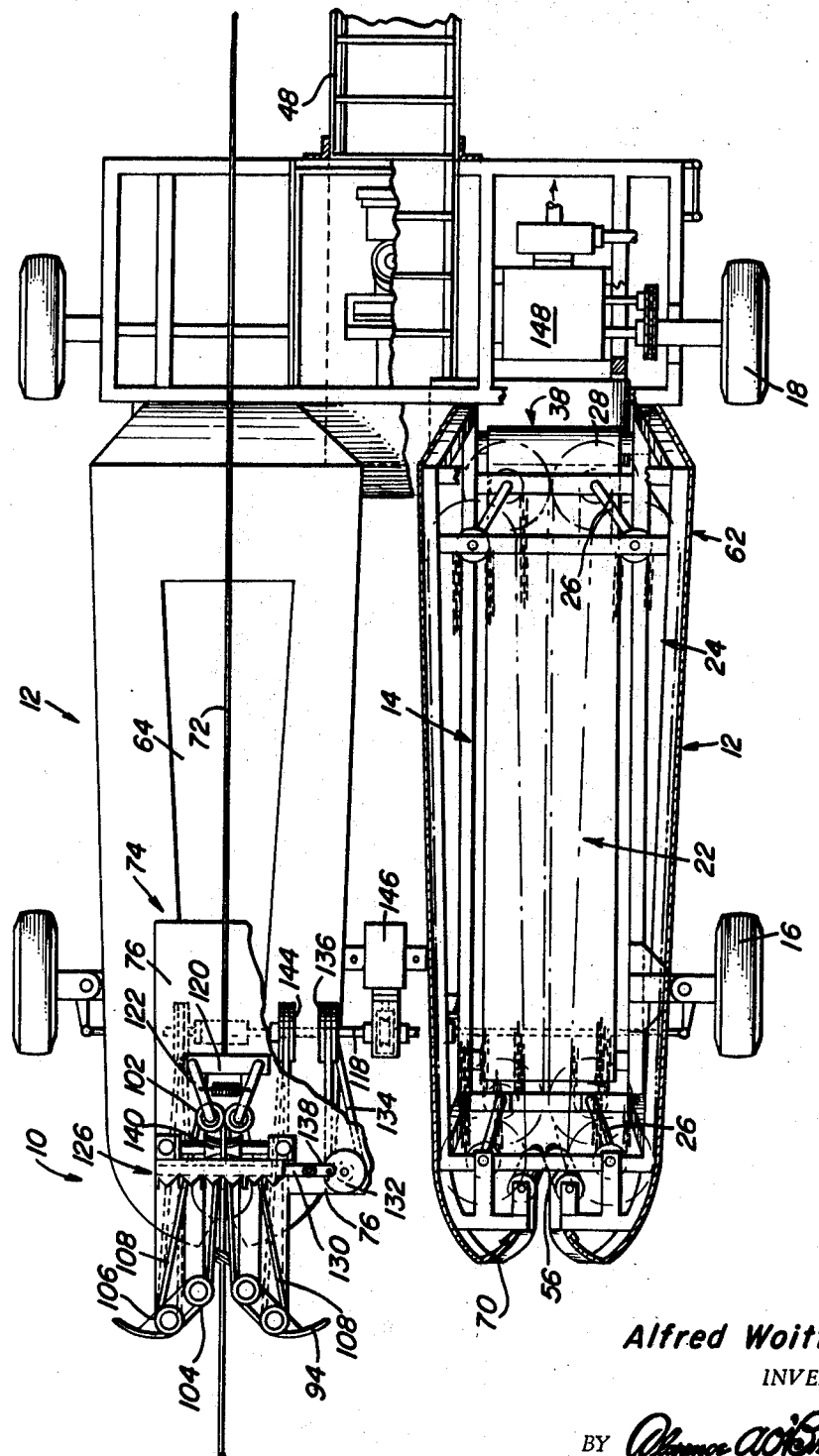
FIGURE 2 is a top plan view of the machine with portions of one of the picker sections broken away for purposes of illustration.

Referring now more specifically to the drawings, reference numeral 10 is used to generally designate the mobile field hop picking machine comprising the instant invention. As will be best appreciated from FIGURES 2, 3 and 7, the machine 10 is set up for a two row picking operation and includes two separate picking sections 12 which, aside from being mounted on a common chassis and the possibility of utilizing some common controls, are independent of each other. Inasmuch as each of the sections 12 constitute a substantial duplicate of the other section, the following description will for the most part be directed toward a single section. By the same token, it will of course be appreciated that the machine 10 can in fact incorporate any reasonable number of sections 12, each accommodating one row of hop vines.

As noted supra, the machine 10 is to be mobile in nature, and as such, comiprses a frame or chassis 14 mounted on suitable ground engaging forward and rear steering and driving wheels 16 and 18. Noting FIGURES 2 and 3 in particular, it will be appreciated that the wheels 16 and 18 are positioned so as to be laterally spaced from the row straddling sections 12, thereby avoiding engagement with either the hop vines 20 or the root systems therefore.

Each picker section 12 includes a picking unit 22 comprising a pair of opposed stripping or picking belts 24. Each of the picking belts 24 operates generally horizontally and defines, in conjunction with the adjacent belt, a downwardly converging wedge-shaped space for the reception of the hop bearing vines 20 therein.

Basically, the picking unit 22 includes, in conjunction with each picking belt 24, forward and rear parallel outwardly inclined generally vertical shafts 26 bearing mounted at the upper and lower ends thereof on the supporting framework of the machine 10. The front and rear shafts 26 associated with each belt 24 in turn mount upper and lower sprocket gears 28 keyed thereon and carrying upper and lower endless chains 30. These upper and lower endless chains 30 constitute a portion of the belt 24 which is completed by elongated laterally spaced parallel bars 32 engaged between each pair of upper and lower sprocket mounted chains 30, and having vertically extending series of outwardly projecting U- or V-shaped picking fingers 34. Each picking belt will preferably be driven by a suitable hydraulic motor 36 operatively engaged with the rear belt supporting shaft 26 with the belts 24 of each unit moving in opposite directions whereby the interior or facing runs thereof will provide a cooperative rearward movement tending to strip the hops from the vines received in the progressively decreasing space between the downwardly converging belts. Incidently, as will be best appreciated from FIGURE 1, the picking unit 22 is upwardly and rearwardly inclined to a slight degree thereby enabling a better utilization of the entire effective height thereof.

Mounted beneath the vine receiving space defined between each pair of picking belts 24 is a rearwardly extending hop conveying endless belt conveyor 38 engaged over front and rear frame mounted rollers 40, the rear roller of which is preferably driven by an appropriate hydraulic motor 42, either independently or in conjunction with similar conveyors 38 as would be associated with any duplicate sections 12 which might be provided. The upper run 44 of the conveyor 38 is specifically orientated so as to receive the picked or stripped hops and convey these hops to a discharge point at the rear of the picking unit 22, the hops then dropping onto a laterally directed roller mounted conveyor 46 which in turn deposits the hops on a suitable centrally located rearwardly directed conveying unit 48 for discharge into a suitable receptacle or the like. The conveyors 46 and 48 will also be preferably driven by suitable independent hydraulic motors 50 and 52. Further, as will be appreciated, when two picker sections 12 are utilized, the associated laterally directed conveyors 46 will preferably discharge into a single rearwardly directed discharging conveyor 48. Suitable braces, struts or the like will of course be provided so as to mount the various conveying units on the framework.

Mounted on the forward end of each picker section, immediately forward of the pair of picking belts 24 and centrally therebetween, is the vine gripping or grasping unit 54. This unit 54 comprises a pair of downwardly converging gripping rollers 56 rotatably mounted in an appropriate manner on the supporting framework and having, at the lower ends thereof, meshed power transferring gears 58. These rollers 56 are preferably rubber faced whereby a positive gripping surface is formed for a grasping and forward pulling of the hop bearing vines 20 through the picking unit 22. As will be appreciated from the drawings, the rollers 56 also define a downwardly converging space therebetween for effecting a progressively greater grasp on the received vines 20. It is contemplated that a single hydraulic motor 60 be drivingly engaged with one of the rollers 56 with the second roller 56 being simultaneously driven in the opposite direction through the meshed gears 58 whereby a synchronized rotation of the rollers 56 will be effected. These rollers, incidently, will rotate forwardly and outwardly in a general direction opposed from that of the belt movement whereby a forward drawing of the hop vines 20 will be effected in conjunction with a rearward combing of the hops therefrom.

It is contemplated that each of the picker sections 12 be enclosed within a suitable housing 62 which confines the vines during the stripping operation thus ensuring a proper discharge of the hops onto the subjacent conveyor 44. This housing 62 will of course have an enlarged opening 64 defined through the top wall 66 thereof, in conjunction with a downwardly converging opening 68 defined in the forward wall thereof. This forward wall in fact comprises two vertical generally convex surfaces 70 which define an enlarged mouth tending to guide the hop vines toward and into engagement with the grasping unit 54 and picking unit 22.

In order to properly release the vines 20 from the overhead trellis support wire 72, the machine 10 specifically incorporates a cutting and positioning unit 74 associated with each picker section 12. Each unit 74 is mounted on a horizontal base 76 positioned vertically above the leading portion of the associated picker section in forwardly projecting relation thereto by means of a plurality of vertical legs or standards 78 projecting upwardly from the picker section housing 62. The base 76 includes a forwardly directed bifurcated portion with the space between the furcations 80 being vertically aligned with the vine receiving housing openings 64 and 68. The forward ends of both furcations 80 define an enlarged vine centering mouth through opposed inwardly inclined edge portions 82.

Overlying each of the furcations 80 and generally paralleling the inner edge 84 thereof and the forwardly directed mouth defining edge 82 is an arm or arm member 86. Each arm 86 includes an elongated section 88 generally paralleling the edge 84 and including a slightly relieved forward edge 90, and a second section 92 generally paralleling the edge 82, the section 92 terminating in a vertically orientated arcuate vine guiding plate 94. Bearings 96, 98 and 100 are provided at the inner end of the arm section 88 at the angular intersection between the arm sections and at the outer end of the arm section 92 immediately inward of the guiding plate 94. Suitable rollers 102, 104 and 106 are rotatably associated with each of the bearings and have an endless gripping belt 108 engaged thereabout. Each arm 86 is rotatably affixed to the outer end of the corresponding furcation 80 through an extension of the roller shaft 110 associated with the forwardmost roller 106 through a bearing defining aperture 112 in the furcation 80, the shaft 110 having a belt mounting pulley 114 affixed to the lower end thereof for a driving of the roller 106 and consequently the corresponding gripping belt 108 through the utilization of an endless drive belt 116 engaged about the pulley 114 and a rearwardly located drive shaft 118.

The opposed belts 108 will of course be driven in opposite directions so as to move continuously inwardly and rearwardly for a gripping of the upper portion of the vines 20 therebetween and a rearward movement thereof relative to the advancing machine 10. In order to ensure a positive and firm grasping of the vines 20, the arms 86, and thereby the belts 108 mounted thereon, are pivoted toward each other about the forward roller shafts 110 so as to define a rearwardly converging vine receiving space between the facing runs of the belts 108. This resilient pivoting of the belts 108 toward each other is, in the illustrated form, effected by providing a fixed vertically orientated member 120 on the base 76 at the inner end of the bifurcated portion in alignment with the vine access space defined thereby and extending a pivotally mounted rigid link 122 from the member 120 to each of the rollers 102, or more particularly the mounting shaft associated therewith. Finally, an elongated compression spring 124 is engaged between the links 122 for a resilient biasing of these links, and consequently the inner ends of the arm sections 88, toward each other. It will of course be appreciated that the actual pivoting of the arms 86 with the belts 108 thereon is effected about the mounting shafts 110 engaged through the apertures 112 at the outer ends of the two furcations 80. In this manner, a positive and resiliently adjustable grip is provided on the upper portions of the vines 20 with the forward movement of the machine 10 in conjunction with a continuous rearward movement of the facing runs of the belts 108 effecting a relative rearward movement of the vines 20 through the housing openings 64 and 68 into engagement with the associated grasping unit 54 and picking unit 22 in the manner best illustrated in FIGURE 1.

The unit 74 is also specifically intended for use as a means for severing the vines 20 from the overhead support wires 72, this being effected through either a cutting of the uppermost portions of the vines 20 or the support lines upon which the vines are growing, depending upon the particular height of the vines themselves. In order to effect this release of the upper end of the vines 20, a cutter 126 is provided horizontally across the opposed belts 108 at approximately mid-point along the length thereof and in vertically spaced relation thereabove. This cutting means 126 can consist of a fixed cutting blade or cutting teeth 128 in conjunction with a reciprocating toothed cutter blade 130 mounted on the fixed blade 128 for guided reciprocal movement thereacross in a manner whereby the cooperating teeth will effect the desired severing or cutting action. It is contemplated that the reciprocal driving of the cutting blade 130 also be effected from the main drive shaft 118. This can be accomplished by the driving of a horizontally orientated disk 132 shaft mounted for rotation on the base 76 in longitudinal alignment with one end of the reciprocating blade 130 as best noted in FIGURE 2. An endless belt 134 will be engaged about a suitable pulley mounted on the disk shaft and about a drive pulley 136 mounted on the drive shaft 118, and finally, a pivotally mounted link 138 will be eneged between an edge portion of the disk 132 and a projecting end portion of the reciprocating blade 130 so as to translate the rotational movement of the disk 132 into longitudinal movement for the blade 130.

Figure 1:
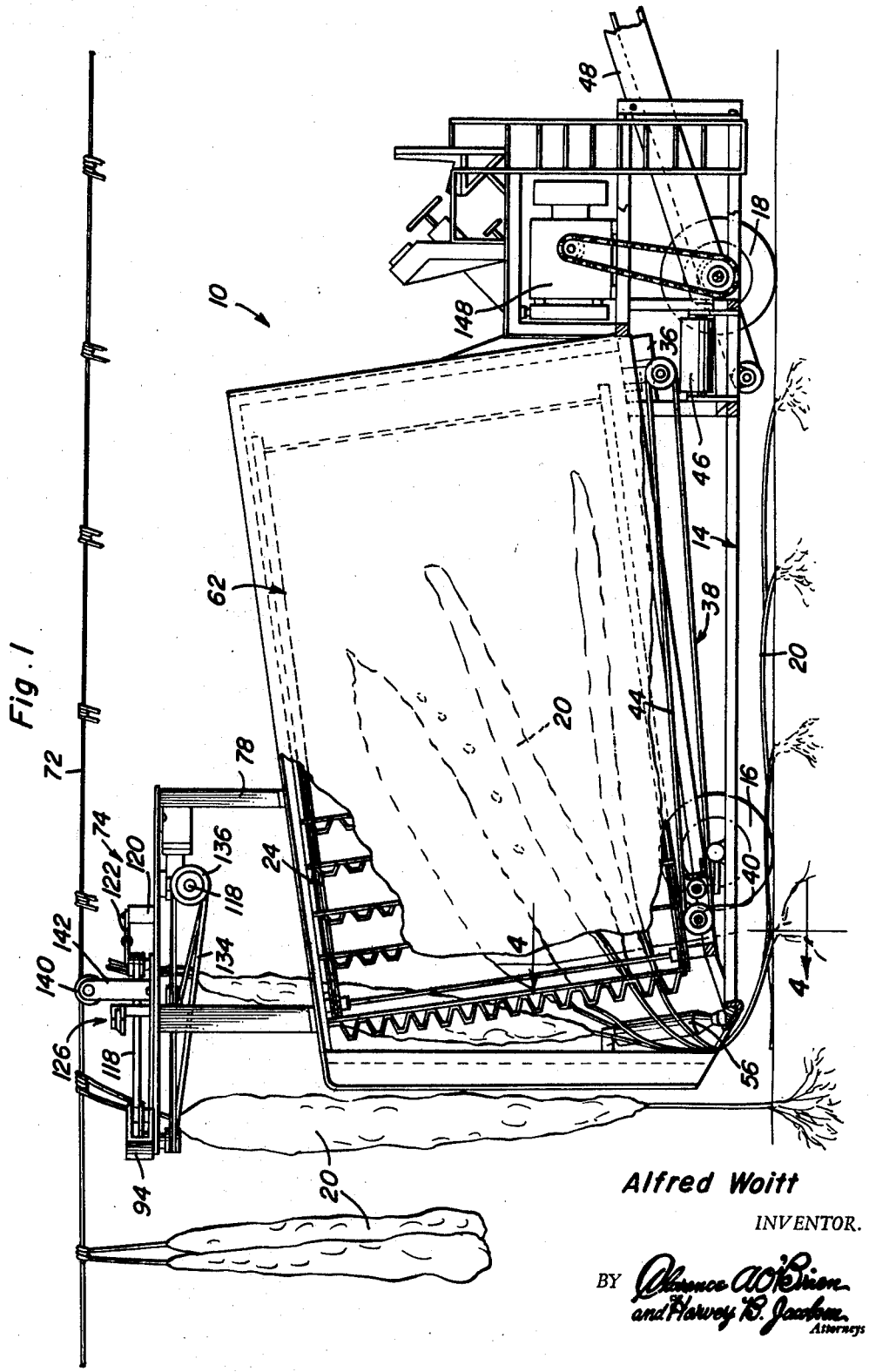
FIGURE 1 is a side elevational view of the hop picking machine of the instant invention in operation and with portions broken away for purposes of illustration.
Figure 3:
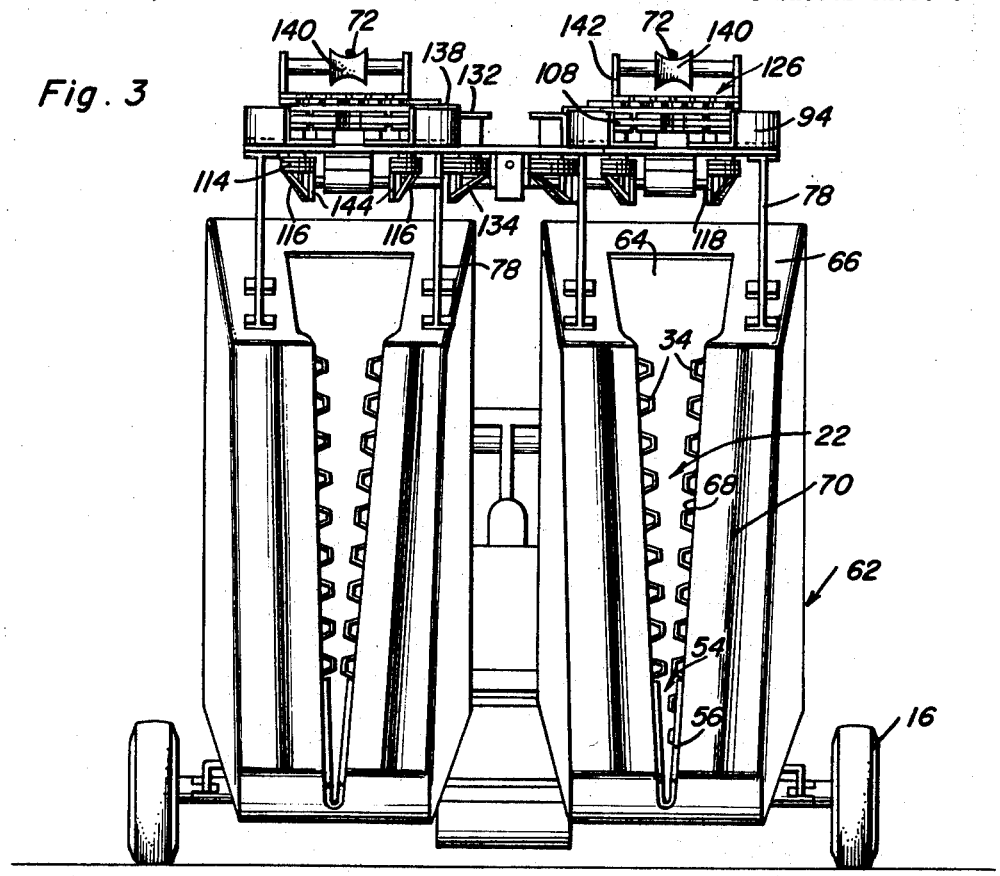
FIGURE 3 is a front elevation view of the machine.
Figure 5:
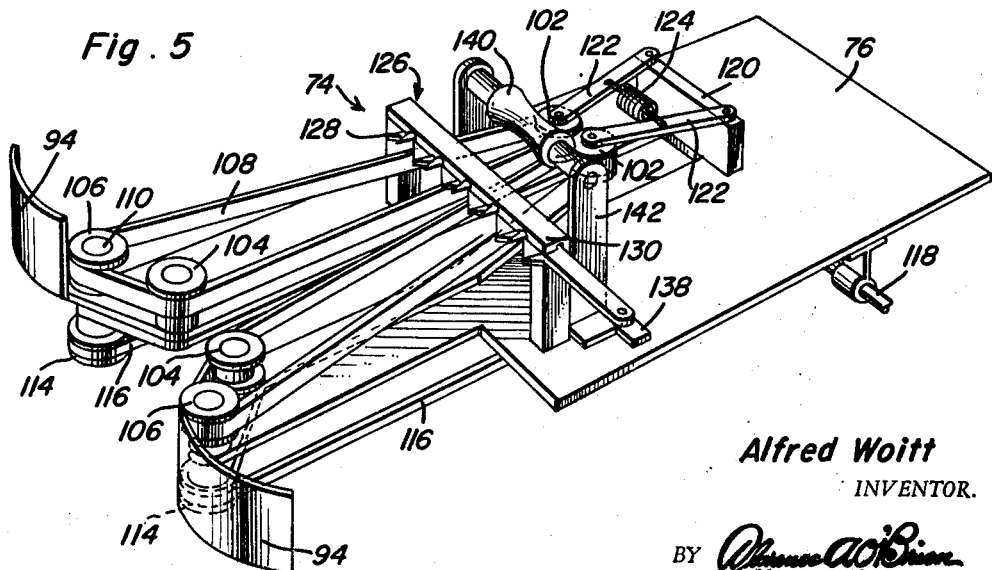
FIGURE 5 is a perspective view of a portion of one of the vine cutting and positioning units.
Figure 4:
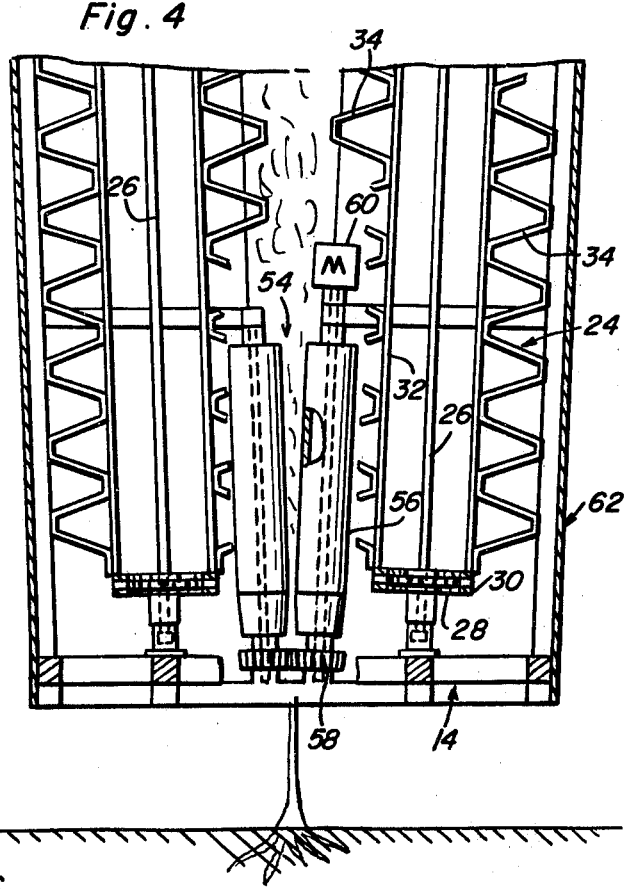
FIGURE 4 is an enlarged partial cross-sectional view taken substantially on a plane passing along line 4—4 in FIGURE 1.
Figure 6:
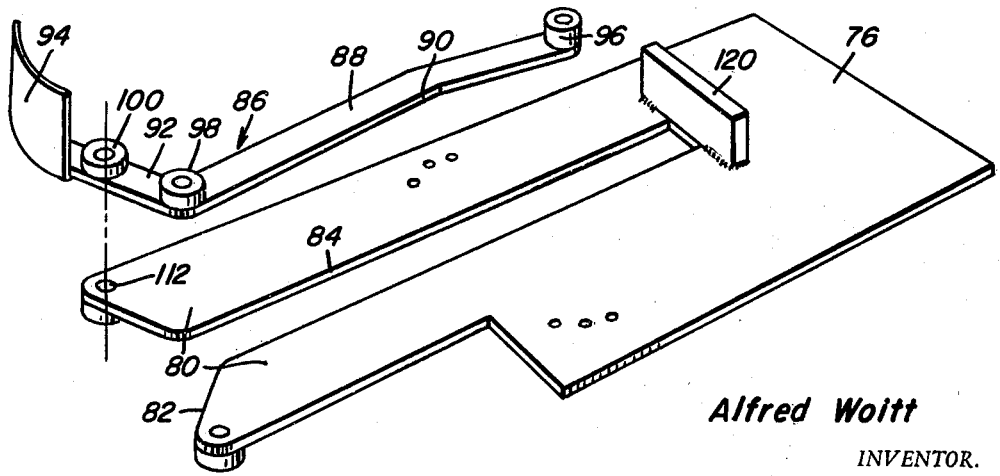
FIGURE 6 is an exploded perspective view of some of the elements of the unit of FIGURE 5.

The unit 74 also includes a peripherally concave guide roller 140 rotatably mounted between opposed upstanding pedestals 142 immediately rearward of the cutter or cutting means 126 and in vertically spaced relation thereabove. The function of this roller 102, noting FIGURES 1 and 3, is to receive and support the overhead wire 72, while at the same time acting as a guide means for the operator in moving the machine 10 down a vine row. It will also be appreciated that this roller 140 will act so as to provide a firm support for the overhead wire 72 as the upper ends of the vines are being cut or severed, thus maintaining the vines relatively taut for a positive gripping of the severed upper portions thereof by the opposed belts 108 for a subsequent positive movement of the vines into the picking unit.

The aforementioned drive shaft 118 mounts, in addition to the drive pulley 136, suitable drive pulleys 144 for the drive belts 116 associated with the gripping belts 108. This drive shaft 118 will preferably be operated by hydraulic motor means 146, with the shaft 118, if so desired, being common to adjacent picker sections as suggested in the drawings.

It is of course contemplated that the hop picking machine 10 be self-propelled as suggested in the drawings wherein the rear wheels are driven directly from the engine 148 with the front steering wheels 116 being hydraulically controlled, the hydraulic system also of course including a suitable pump and fluid reservoir.

In actual operation, the machine 10 is aligned with a row of wire supported hop vines and moved continuously therealong with the uppermost roller 140 in wire supporting guiding engagement with the wire 72. As the machine 10 advances to the hop vines 20, which in some instances may be supported in pairs, the upper portion of each vine 20 is received between the gripping belts 108 and progressively moved relatively rearward both before and after a severing of the vine 20 above the belt gripped portion. Once the vine passes beyond the rear ends of the belts 108, the vine has moved a substantial distance into the associated picker station 22 where it gradually assumes a horizontal position as it drops downwardly between the picking belts 24 and is drawn forwardly by the grasping unit 54. It is also contemplated that the particular vine 20 be engaged with the grasping unit 54 either immediately prior to or immediately subsequent to a release of the vine from the overhead positioning unit 74. The picking belts 24 within the picking unit move rearwardly at a slight upward inclination, effectively stripping the hops from the vine 20 with the stripped hops discharging vertically on a subjacent conveyor belt 44 for subsequent discharge rearward of the machine 10 in a suitable receptacle by means of a series of communicating conveying units. In conjunction with a rearward stripping of the hops by the picking belts 24, the vines 20 are pulled forwardly therebetween by the grasping rollers 56 which draw the stripped vines 20 from between the picking belts 24 and in effect gently deposit the vines 20 on the ground between the support wheels 16 and 18 of the vehicle, thus avoiding any damaging bruising of the vines or compaction of the root system. As will be appreciated, the converging orientation of the picking belts 24 and the grasping rollers 56 allow for a free movement of the hop vines 20 thereinto and both a progressively greater picking action as the vine falls between the belts 24, and a progressive increase in the grasping pressure on the vines with the grasping rollers 56, the rollers 56, in light of the converging nature thereof, exerting only such pressure on the vines 20 as is required to draw the vines forwardly from the picking unit and position the vines on the ground where they might continue their actual growing cycle.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A hop picking machine including at least one picker section and means for propelling the machine along a row of hop vines, said section including opposed cooperating picking belts defining a vine receiving space therebetween, vine engaging and grasping means mounted forward of said picking belts along the path of movement of the machine and in vertically spaced relation to the ground for reception of and independent grasping engagement with the vines and means for driving said vine engaging and grasping means whereby a forward drawing of a received vine from between the picking belts for a subsequent depositing of the vines on the ground below the machine can be effected, said machine being maintained in vertically spaced straddling relation to the vine root systems of any traversed vine row by laterally spaced ground engaging support means.

2. The machine of claim 1 including means for severing the supported upper ends of vines prior to an introduction thereof between the picking belts.

3. The machine of claim 2 including positioning means for grasping the upper portions of severed vines and moving the vines rearwardly into the space defined between the picking belts, said positioning means being located in vertically spaced relation above the forward ends of said picking belts and in slightly forwardly projecting relation thereto for engagement with the approached vines prior to said picking belts.

4. The machine of claim 3 wherein said picking belts are generally vertically orientated and travel along a generally horizontal path so as to effect a rearward stripping of the hops from the vines in conjunction with a forward movement of the machine.

5. The machine of claim 4 wherein said vine engaging means comprises a pair of opposed cooperating generally vertical rollers defining a vine receiving space therebetween in longitudinal alignment with the space defined between the picking belts, said rollers converging downwardly toward each other so as to define a progressively diminishing vine receiving space therebetween for effecting a gripping engagement with a received vine, and means for effecting a simultaneous rotation of said rollers in opposed directions whereby a forward drawing of a received vine will be effected.

6. The machine of claim 5 wherein said positioning means comprises a pair of opposed cooperating belts including rearwardly moving facing runs extending from a point forward of the picking belts to a point inwardly of the leading portions of the picking belts, said facing runs securely receiving vines therebetween and moving said vines rearwardly into said picking belts prior to a discharge thereof, and means for resiliently biasing said positioning means belts toward each other for effecting a firm grasping of the received vines.

7. The machine of claim 6 wherein the means for cutting the upper ends of said vines comprises moving blade means located in vertically spaced relation above said positioning means belts and at a central point along the length thereof.

8. The machine of claim 7 including a horizontally orientated roller mounted in vertically spaced relation over said blade means and slightly to the rear thereof, said last-mentioned roller constituting a support for, and guide means utilized in conjunction with, an overhead vine supporting wire.

9. The machine of claim 1 including positioning means for grasping the upper portion of vines and moving the vines rearwardly into the space defined between the picking belts, said positioning means being located in vertically spaced relation above the forward ends of said picking belts and in slightly forwardly projecting relation thereto for engagement wtih the approached vines prior to said picking belts.

10. The machine of claim 1 wherein said vine engaging and grasping means comprises a pair of opposed cooperating generally vertical rollers defining a vine receiving space therebetween in longitudinal alignment with the space defined between the picking belts, said rollers converging downwardly toward each other so as to define a progressively diminishing vine receiving space therebetween for effecting a gripping engagement with a received vine, said means for driving effecting a simultaneous rotation of said rollers in opposed directions whereby the forward drawing of a received vine will be effected.

11. A hop picking machine for stripping rooted hop vines in the field, said machine including a pair of opposed cooperating picking members defining a hop vine receiving space therebetween, means for propelling said machine along a row of hop vines, means for freeing the upper portion of a hop vine and moving the upper portion thereof rearwardly relative to a forward moving machine between the picking members, and means for drawing vines received between the picking members forwardly out of the space defined between said picking members during and subsequent to the picking of the hops from the vines, said opposed cooperating picking members comprising a pair of opposed generally vertically orientated endless picking belts, said picking belts converging downwardly, and means driving said belts generally horizontally with the opposed facing runs thereof both moving rearwardly.

12. A hop picking machine for stripping rooted hop vines in the field, said machine including a pair of opposed cooperating picking members defining a hop vine receiving space therebetween, means for propelling said machine along a row of hop vines, means for freeing the upper portion of a hop vine and moving the upper portion thereof rearwardly relative to a forwardly moving machine between the picking members, and means for drawing vines received between the picking members forwardly out of the space defined between said picking members during and subsequent to the picking of the hops from the vines, said means for drawing vines forwardly comprising a pair of opposed downwardly converging grasping rollers located immediately forward of the picking members and in alignment with the space defined therebetween.

13. A hop picking machine for stripping rooted hop vines in the field, said machine including a pair of opposed cooperating picking members defining a hop vine receiving space therebetween, means for propelling said machine along a row of hop vines, means for freeing the upper portion of a hop vine and moving the upper portion thereof rearwardly relative to a forwardly moving machine between the picking members, and means for drawing vines received between the picking members forwardly out of the space defined between said picking members during and subsequent to the picking of the hops from the vines, the means for introducing the vines between the picking members comprising a pair of horizontally moving opposed endless belts defining a vine receiving space therebetween, means mounting said last mentioned belts in vertically spaced relation above said picking members, said last mentioned belts being so orientated as to project both forwardly beyond the forward edges of said picking members and rearwardly thereof whereby received vines will be initially grasped and positively moved rearwardly into said picking members.

14. The machine of claim 11 wherein each of said picking belts includes a series of elongated generally vertically orientated laterally spaced parallel bars, chain means engaging and mounting said bars, and a series of outwardly extending picking fingers mounted on each of said bars.

15. The machine of claim 13 wherein said last mentioned belts are adjustably mounted, and means for resiliently biasing said last mentioned belts toward each other whereby a positive grip will be provided on received vines, said means for freeng the upper portion of a hop vine including vine cutting means provided transversely across the last mentioned belts in the path of movement of a belt moved vine.

16. A hop picking machine for stripping rooted hop vines in the field, said machine including a pair of opposed cooperating picking members defining a hop vine receiving space therebetween, means for propelling said machine along a row of hop vines whereby said hop vines are introduced into said machine between the opposed picking members for the picking of the hops therefrom, means driving said picking members for effecting a picking of the hops from the received vines, and means for drawing vines received between the picking members out of the space defined between said picking members during and subsequent to the picking of the hops from the vines, said means for drawing vines being located outward of said picking members and comprising a pair of opposed grasping rollers located in the path of movement of the vines through the machine for engagement therewith, and means for driving said pair of grasping rollers for effecting an outward drawing of the received vines.

17. The machine of claim 16 wherein the opposed grasping rollers are substantially vertically orientated and in alignment with the hop vine receiving space between the picking members.

18. The machine of claim 17 wherein said grasping rollers are located immediately forward of the picking members.

References Cited

UNITED STATES PATENTS 2,447,122   8/1948   Horst _____ 56—30

ANTONIO F. GUIDA, Primary Examiner

U.S. Cl. X.R.

130—30